(12) United States Patent
Martinelli

(10) Patent No.: US 10,001,603 B2
(45) Date of Patent: Jun. 19, 2018

(54) OPTICAL MULTIPLEXER/DEMULTIPLEXER DEVICE COMPRISING PORRO PRISMS

(71) Applicant: Politecnico Di Milano, Milan (IT)

(72) Inventor: Mario Martinelli, San Donato Milanese (IT)

(73) Assignee: POLITECNICO DI MILANO, Milan (IT)

( * ) Notice: Subject to any disclaimer, the term of this patent is extended or adjusted under 35 U.S.C. 154(b) by 60 days.

(21) Appl. No.: 15/122,953

(22) PCT Filed: Mar. 17, 2015

(86) PCT No.: PCT/IB2015/051935
§ 371 (c)(1),
(2) Date: Sep. 1, 2016

(87) PCT Pub. No.: WO2015/140703
PCT Pub. Date: Sep. 24, 2015

(65) Prior Publication Data
US 2017/0075069 A1   Mar. 16, 2017

(30) Foreign Application Priority Data

Mar. 18, 2014  (IT) .............................. MI2014A0441

(51) Int. Cl.
*G02B 27/14*   (2006.01)
*G02B 6/293*   (2006.01)
(Continued)

(52) U.S. Cl.
CPC ....... *G02B 6/29349* (2013.01); *G02B 6/2766* (2013.01); *G02B 6/2817* (2013.01);
(Continued)

(58) Field of Classification Search
CPC ........... H04J 14/04; H04J 11/00; G02B 27/10; G02B 27/145; G02B 27/149; G02B 27/108; G02B 27/14; G02B 27/144; G02B 6/29349; G02B 6/2938; G02B 6/29397; G02B 6/2766; G02B 6/2817; G02B 6/34
USPC ....... 359/583; 398/44–46, 74, 103, 185, 188
See application file for complete search history.

(56) References Cited

U.S. PATENT DOCUMENTS

2005/0259914 A1* 11/2005 Padgett .................. H01Q 21/26
                                                                385/16

OTHER PUBLICATIONS

International Search Report and Written Opinion in PCT/IB2015/051935 dated Jul. 14, 2014.
(Continued)

*Primary Examiner* — Marin Pichler
(74) *Attorney, Agent, or Firm* — Manelli Selter PLLC; Edward J. Stemberger

(57) ABSTRACT

Described herein is a multiplexer/demultiplexer optical device (100) comprising: a first beam-splitter cube (BS1); a second beam-splitter cube (BS2) optically coupled to the first splitter (BS1); a first Porro-prism reflector (PR1), which is optically coupled to the second splitter (BS2); and a second Porro-prism reflector (PR2), which is optically coupled to the second splitter (BS2) and is structured for introducing into optical beams that traverse it a phase delay depending upon an orbital angular momentum of the optical beams and upon an orientation of the second reflector. The device is a Michelson interferometer structured for obtaining constructive/destructive interference such as to multiplex/demultiplex on/from corresponding input/output ports, on the basis of values of orbital angular momentum, an optical beam comprising a plurality of concentric optical beams with cylindrical symmetry having different values of orbital angular momentum.

8 Claims, 12 Drawing Sheets

(51) Int. Cl.
  *G02B 6/34* (2006.01)
  *G02B 6/28* (2006.01)
  *H04J 14/04* (2006.01)
  *G02B 6/27* (2006.01)

(52) U.S. Cl.
  CPC ....... *G02B 6/2938* (2013.01); *G02B 6/29397* (2013.01); *G02B 6/34* (2013.01); *G02B 27/145* (2013.01); *G02B 27/149* (2013.01); *H04J 14/04* (2013.01)

(56) References Cited

OTHER PUBLICATIONS

Gao et al., "Superposition of helical beams by using Michelson interferometer", Optics Express, vol. 18, No. 1, Jan. 4, 2010, p. 72.
Leach et al., "Interferometric Methods to Measure Orbital and Spin, or the Total Annular Momentum of a Single Photon", Physical Review Letters, vol. 92, No. 1, Jan. 1, 2004.
Richarson, D.J. et al., Space-division multiplexing in optical fibres, Nature Photonics, vol. 7, 354-362, May 2013.
Wang, J. et al., "Terabit free-space data transmission employing orbital angular momentum multiplexing", Nature Photonics, vol. 6, 488-496, Jul. 2012.
Leach, J. et al., "Measuring the orbital momentum of a single photon", Phys. Review Letter, vol. 88, 257901-1-257901-4, Jun. 24, 2002.
Liu, YD, et al., "Field Rotation and polarization properties of the Porro prism", J. Opt. Soc. Am. A, vol. 26, 1157-1160, May 2009.
Galvez, E.J. et al., "Geometric phase of optical rotators", J. Opt. Soc. Am. A, vol. 16, 1981-1985, Aug. 1999.

\* cited by examiner

OPTICAL MULTIPLEXER/DEMULTIPLEXER DEVICE COMPRISING PORRO PRISMS

TECHNICAL FIELD

The present description relates to operations of multiplexing and demultiplexing of optical beams.

KNOWN ART

In optical communications there is an increasing use of orbital angular momentum (OAM) as a further property of photons to enable transmissions with higher capacity. In this connection, reference may be made to the following papers:

[1] Richardson D. J. et al., Space-division multiplexing in optical fibres, Nature Ph., vol. 7, 354 (2013); and

[2] Wang J. et al., Terabit free-space data transmission employing orbital angular momentum multiplexing, Nature Ph. Vol. 6, 488 (2012).

In the above communication systems, the value of the angular momentum of the photons (henceforth designated by "l", which can assume both positive and negative integer values: l=0, +/−1, 2, 3, . . . ) is used as further label of photons in addition to the colour label already used for developing optical communication systems with colour (or frequency) multiplexing, referred to as "wavelength-division multiplexing" (WDM).

The present applicant notes that, in order to develop effectively a mode-division multiplexing (MDM) system or else space-division multiplexing (SDM) system, it is necessary to have available efficient multiplexing devices (i.e., devices for introduction of various modes with different OAM value in one and the same optical beam or optical fibre) and de-multiplexing devices (i.e., devices for extracting various modes with different OAM value from one and the same optical beam or optical fibre).

The present applicant notes that the papers [1] and [2] cited above describe multiplexers that use holographic devices, which present considerable losses, large overall dimensions, and poor selectivity in division of the beams with different values of OAM. Said holographic devices are moreover coupled to optical devices, which present considerable losses and are far from selective in division of the beams with different OAM values.

The papers "Leach J. et al., Measuring the orbital momentum of a single photon, Phys. Rev. Lett. Vol. 88, 257901-1 (2002)" and "Leach J. et al., Interferometric methods to measure orbital and spin or the total angular momentum of a single photon, Ph. Rev. Lett., vol. 92, 013601-4 (2004)" describe interferometers of a Mach-Zehnder type provided with rotated Dove prisms. The present applicant notes that said interferometers are cumbersome and complex to produce, especially as a result of the problems linked to alignment of the Dove prisms themselves within the Mach-Zehnder interferometer.

The article "C. Gao, X. Qi, Y. Liu e H. Weber, Superposition of Helical Beams by using a Michelson Interferometer, OPTIC EXPRESS, Vol. 18, No. 1, 4 Jan. 2010" regards superposition of helical optical beams with different OAM states distributed symmetrically on a ring. Moreover, in said paper, it is specified, with reference to an experimental apparatus, how, following upon a continuous variation of polarization of the optical beams, their interference is avoided.

SUMMARY

The present applicant has tackled the problem of defining a multiplexer/demultiplexer device for optical beams with different orbital angular momentum that will be efficient and will present a structure with low encumbrance and complexity.

A solution to the problems indicated above is afforded by a multiplexer/demultiplexer device as described in Claim 1. Particular embodiments are described in the dependent claims.

BRIEF DESCRIPTION OF THE DRAWINGS

Some non-limiting examples of embodiment will now be described, with reference to the annexed figures, wherein.

DETAILED DESCRIPTION

Figure 1:
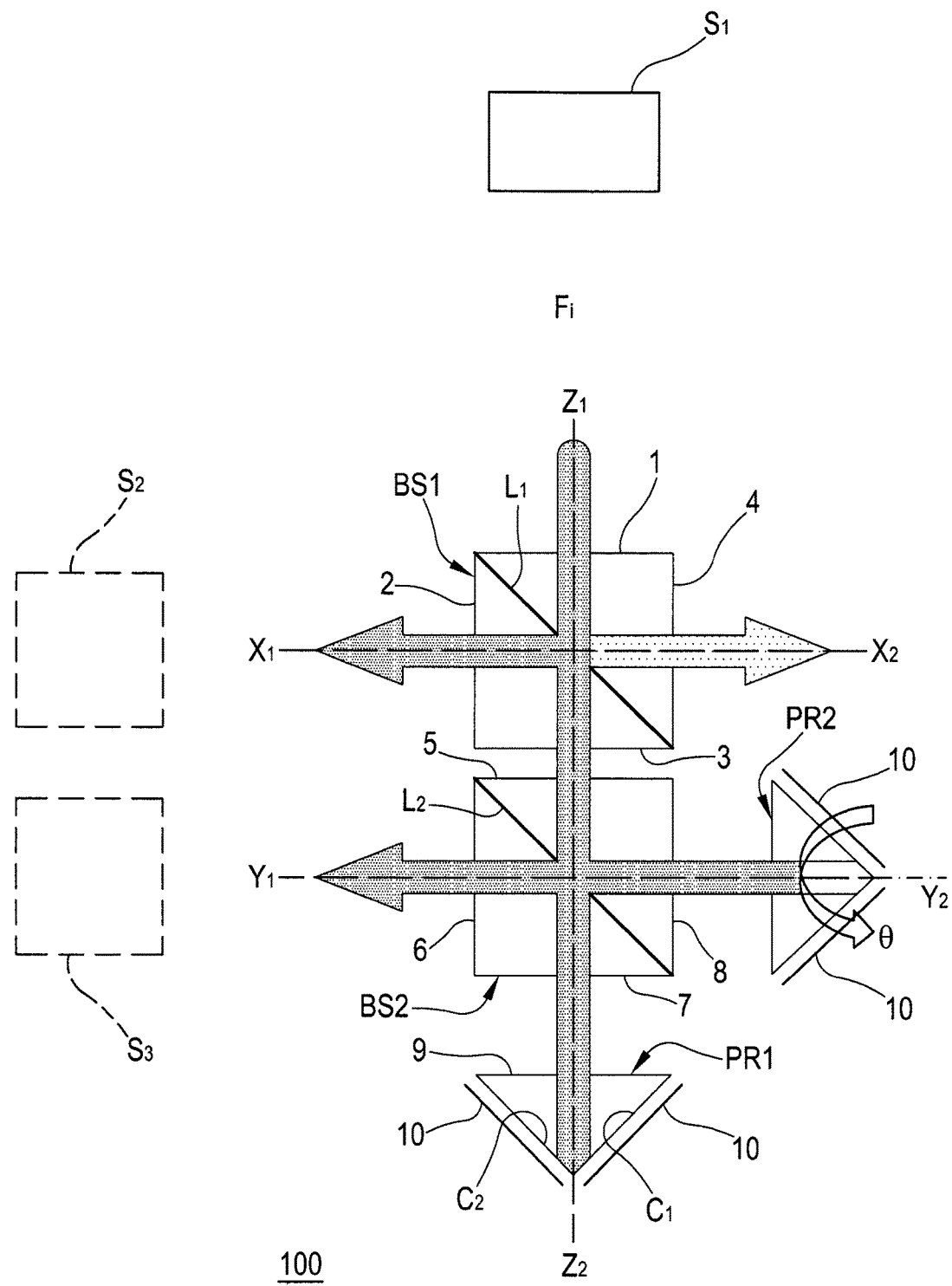
FIG. 1 is a schematic illustration of an example of a first multiplexer/demultiplexer device independent of polarization.

FIG. 1 shows a first multiplexer/demultiplexer device 100 comprising a first beam-splitter cube BS1, a second beam-splitter cube BS2, a first Porro-prism reflector PR1, and a second Porro-prism reflector PR2.

In particular, the first beam-splitter cube BS1 (referred to, for brevity, as "first splitter BS1") and the second beam-splitter cube BS2 (referred to, for brevity, as "second splitter BS2") are aligned in a main direction $z_1$-$z_2$ having its own splitting planes L1 and L2 set parallel to one another.

The first splitter BS1 and the second splitter BS2 are, in particular, independent of the state of polarization of the optical beams that traverse them.

The first splitter BS1 comprises a first input/output port 1, a second input/output port 2, a third input/output port 3, and a fourth input/output port 4. Said input/output ports 1-4 coincide with four faces of the cube corresponding to the first splitter BS1.

The second splitter BS2 comprises a fifth input/output port 5, a sixth input/output port 6, a seventh input/output port 7, and an eighth input/output port 8. Said input/output ports 5-8 coincide with four faces of the cube corresponding to the second splitter BS2. The fifth input/output port faces the third input/output port 3 of the first splitter BS1.

Moreover, the first splitter BS1 identifies a first input/output direction $x_1$-$x_2$ along which the second input/output port 2 and the fourth input/output port 4 are aligned. The second splitter BS2 identifies a second input/output direction $y_1$-$y_2$ along which the sixth input/output port 6 and the eighth input/output port 8 are aligned.

As regards the first Porro-prism reflector PR1 and the second Porro-prism reflector PR2, it should be noted that Porro prisms, also known as "roof prisms" or "right-angle prisms", are reflecting optical devices known to the person skilled in the branch. The first Porro prism PR1 and the second Porro prism PR2 are bulk optical devices made, for example, of glass (for instance, BK-7) or some other, even non-vitreous, transparent material.

The scientific papers "Galvez E. J. et al., Geometric phase of optical rotators, J. Opt. Soc. Am. A, Vol. 16, 1981, (1999)" and "Liu Y D, et al., Field Rotation and polarization properties of the Porro prism, J. Opt. Soc. Am. A, Vol. 26, 1157, (2009)" describe some properties of Porro prisms useful for a complete understanding of the present description.

In particular, the first Porro prism PR1 (hereinafter, for brevity, also referred to as "first prism") is set so as to present a ninth input/output port 9 corresponding to a hypotenuse plane of the prism itself. Said ninth input/output port 9 faces the seventh input/output port 7 of the second splitter BS2 and is set in such a way that an optical beam leaving the seventh input/output port 7 will impinges centrally on the first prism PR1 so as to strike symmetrically the two catheti C1 and C2 of the prism itself.

The first prism PR1 is aligned in the first direction $z_1$-$z_2$ that traverses the vertex of the first prism PR1 itself. Moreover, according to the example described, the first prism PR1 is set with respect to its own axis (which coincides with the first direction $z_1$-$z_2$) in such a way as to not introduce any phase delay depending upon the orbital angular momentum of the optical beam that impinges thereon.

Preferably, the reflecting surfaces, corresponding to the catheti C1 and C2, of the first prism PR1 are mirror-finished, for example with purposely provided silver coatings 10. In this way, there is guaranteed an operation of the device that is substantially independent of the state of polarization of the various OAM beams.

The second prism PR2 is aligned in the second input/output direction $y_1$-$y_2$ that traverses the vertex of the second prism PR2 itself. Moreover, according to the example described, the second prism PR2 is rotated through an angle θ with respect to its own axis (coinciding with the second direction $y_1$-$y_2$) in such a way as to introduce a phase delay Φ depending upon the orbital angular momentum l of the optical beam that impinges thereon:

$$\Phi = 2 \, l \theta \quad (1)$$

Preferably, also the reflecting surfaces, corresponding to the catheti C1 and C2, of the second prism PR2 are mirror-finished as described for the first prism PR1.

In operation of the first device 100 as demultiplexer, the first input/output port 1 acts as input port for an optical radiation generated by a first source S1, whereas the second port 2 and the sixth port 6 operate as output ports for demultiplexed optical beams.

In operation of the first device 100 as multiplexer, the second port 2 and the sixth port 6 operate as input ports for optical beams to be multiplexed (generated by a second source S2 and a third source S3), and the first port 1 acts as output port for the multiplexed optical radiation.

Figure 2:
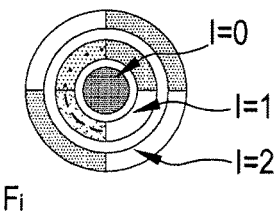
FIG. 2 is a schematic illustration of a composite optical beam comprising concentric optical beams with cylindrical symmetry that have constant intensity and a diameter that increases as the orbital-angular-momentum number increases.

Consider the composition of an input beam Fi to be demultiplexed as represented in FIG. 2, where, by way of example, three beams are considered with distinct values of orbital angular momentum OAM, namely, 0, 1, 2. These beams (which may be Laguerre-Gauss or Bessel beams in free space or Laguerre-Gauss beams or angular vortices in optical fibre) present as concentric optical beams with cylindrical symmetry, i.e., as rings of constant intensity and with a diameter that increases as the OAM number increases. The phase of these rings increases from 0 to $2\pi$, in one turn for l=1, in half a turn for l=2, in one third of a turn for l=3, and so on. In the figures attached to the present description, the variation of phase in the angular sectors of the beams is represented with a white sector, a dark sector, a dotted sector, and a sector with dashes.

Assume that this composite beam Fi (for example, coming from the optical fibre that acts as first source S1) enters the first input port 1 of the first device 100.

The beam Fi impinges on the first input port 1 and is split (for example, at 50%) by the first splitter BS1 into a transmitted portion that propagates in the main direction $z_1$-$z_2$ coming from the third port 3 and a reflected portion that comes out through the fourth port 4.

The transmitted portion of the beam Fi that impinges on the second splitter BS2 is again split (for example, at 50%) into two portions: a transmitted portion that impinges on the first prism PR1 and a reflected portion that impinges on the second prism PR2.

The first prism PR1 reflects the radiation that impinges thereon without introducing phase delays that depend upon the orbital angular momentum, whereas the second prism PR2 reflects the optical beam that impinges thereon introducing also a phase delay given by the relation (1) appearing above.

Figure 3:
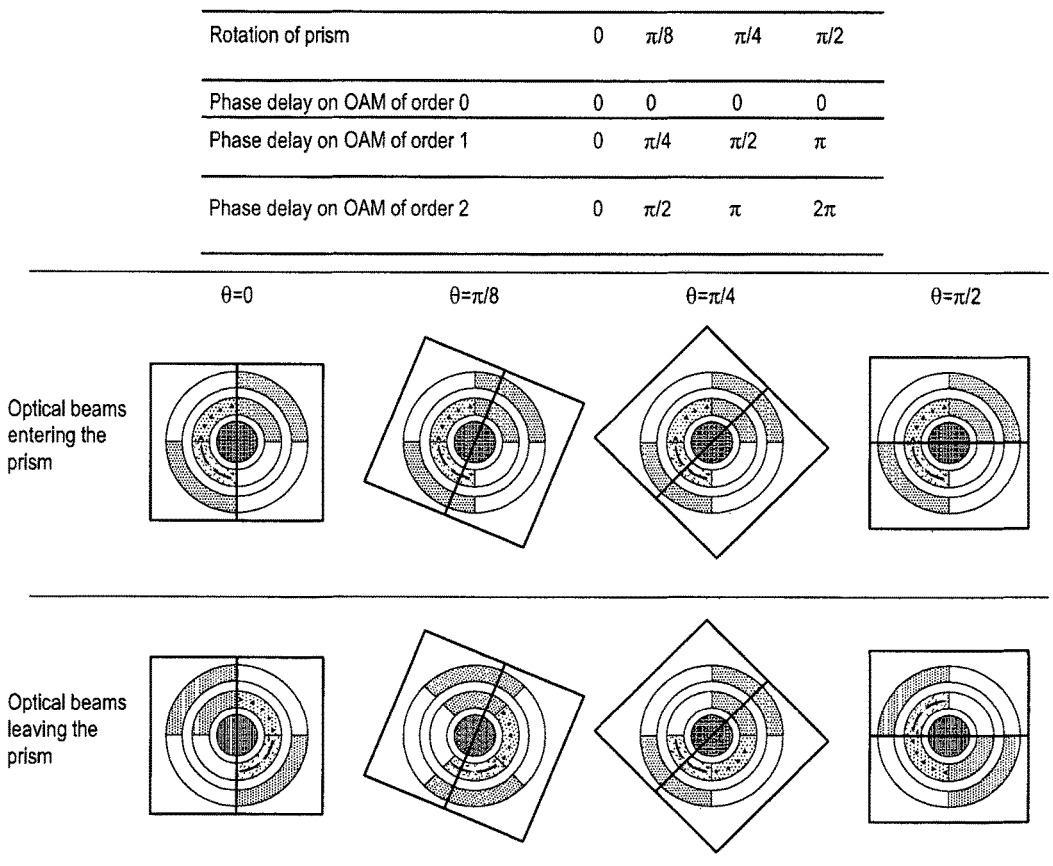
FIG. 3 shows a table representing the phase shift introduced by a Porro prism as its own orientation varies.

The table of FIG. 3 illustrates the optical beams that enter the second prism PR2 and are reflected with the corresponding phase values.

The device 100 is sized in such a way that the return beam coming from the arm of the interferometer that includes the second prism PR2 and the return beam coming from the arm that includes the first prism PR1 present phase delays such that they will interfere in the prisms PR1 and PR2 themselves in conditions of constructive interference (with a phase equal to 0 or multiples of $2\pi$) or destructive interference (with a phase equal to $\pi$ or odd multiples of $\pi$) according to the values of the orbital angular momentum l. This enables the beams with different orbital angular momentum l (for example even and odd) to be directed onto the sixth output port 6 or onto the second output port 2.

Figure 4:
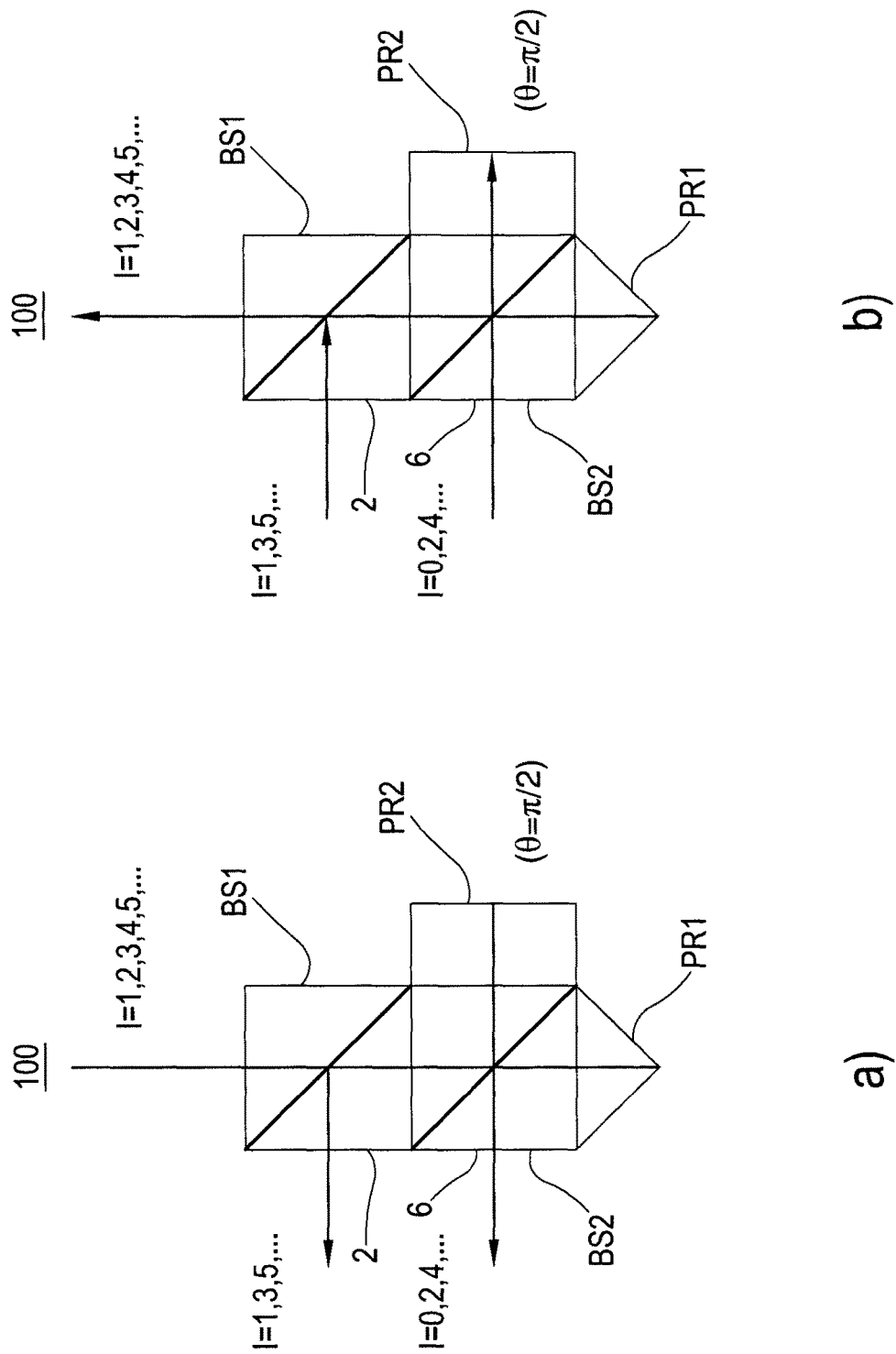
FIG. 4 shows an example of embodiment of the device of FIG. 1 and illustrates operation as demultiplexer and as multiplexer.

For example, reference may be made to FIG. 4, which shows an embodiment of the first optical device 100 in which the second prism PR2 is rotated through an angle $\theta=\pi/2$ and in which the optical components used are directly in contact with one another. Consequently, the second prism PR2 introduces a phase shift of $\pi$.

For FIG. 4a, which regards operation as demultiplexer, the second output port 2 is a constructive-interference port for the beams that have odd orbital angular momentum l=1, 3, 5, . . . and a destructive-interference port (i.e., with zero output power) for the beams that have even orbital angular momentum l=0, 2, 4. Instead, as a result of the properties of the interferometers corresponding to the complementary ports, the sixth output port 6 is a constructive-interference port for the beams that have even orbital angular momentum l=0, 2, 4 . . . and a destructive-interference port for the beams that have odd orbital angular momentum l=1, 3, 5 . . . . In this way, a demultiplexing of the beams that have even orbital angular momentum from those that have odd orbital angular momentum is obtained.

FIG. 4b regards, instead, operation as multiplexer, which is complementary to operation as demultiplexer. According to the example, the beams with odd orbital angular momentum, emitted by the second source S2, are supplied to the second input port 2 of the first splitter BS1, whereas the beams with odd angular momentum, emitted by the third source S3, are supplied to the sixth input port 6 of the second splitter BS2.

It should be noted that the first multiplexer/demultiplexer 100 presents power losses that occur following upon use of the first splitter BS1, which is necessary both for introducing the beam to be demultiplexed (or multiplexed) and for extracting the demultiplexed (or multiplexed) beams. Since the first splitter BS1 is of the 50:50 type, there is a net power loss of a factor 2 (equal to 3 dB in power) at input for the beam to be treated and a further loss of a factor 2 (once again 3 dB in power, for a total of 6 dB) for the beam that in the scheme of FIG. 1 is present on the second output port 2.

Figure 5:
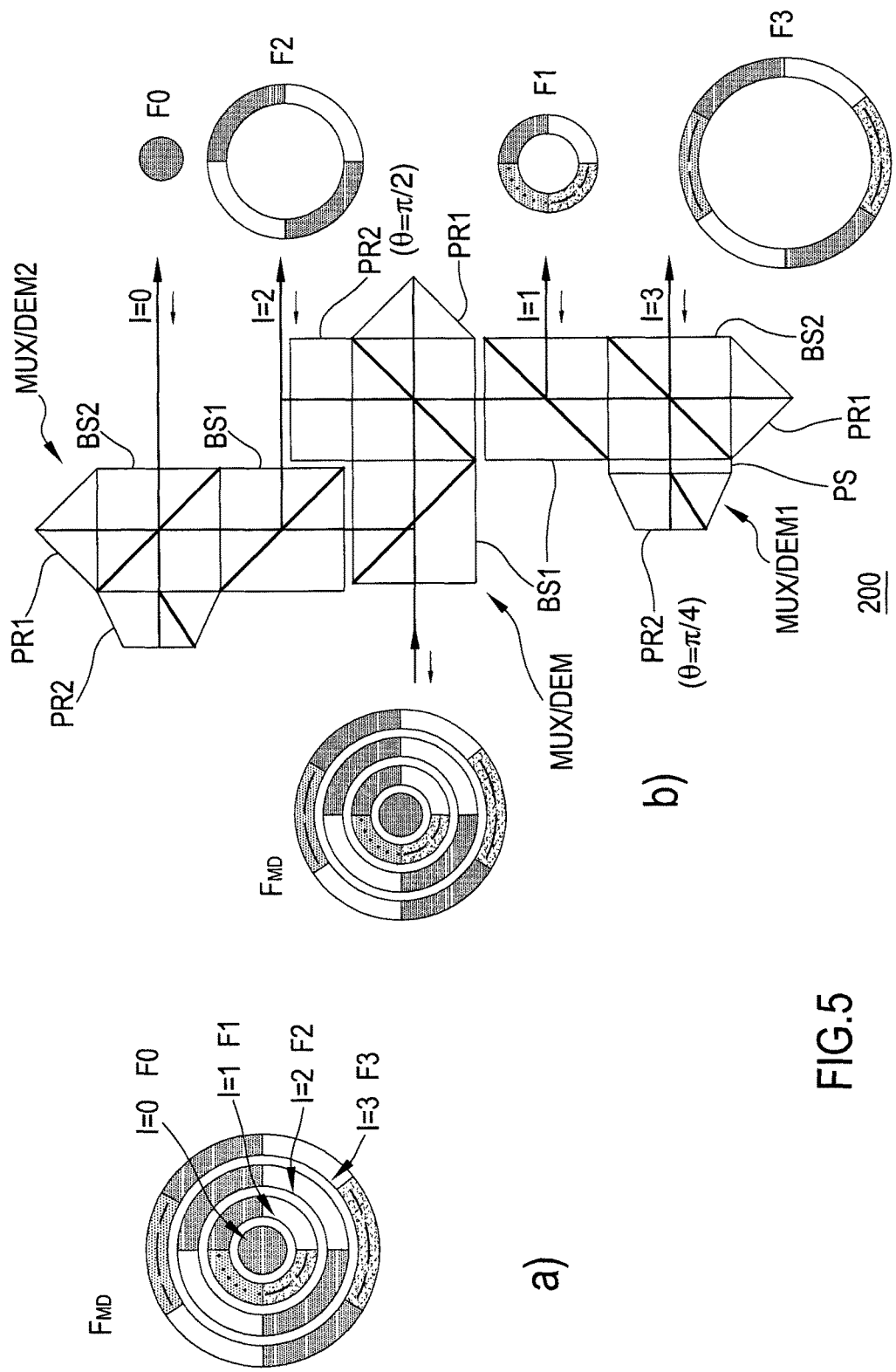
FIG. 5 is a schematic illustration of an example of a second multiplexer/demultiplexer device independent of polarization and suitable for 1:4 demultiplexing.

FIG. 5 shows a second multiplexer/demultiplexer device 200 structured for multiplexing/demultiplexing a composite beam $F_{MD}$ containing four beams F0, F1, F2, F3 that have different orbital angular momenta, for example, l=0, 1, 2, 3 (FIG. 5a), respectively.

In operation as demultiplexer, the second device 200 enables separation of the composite beam $F_{MD}$ into four output beams F0, F1, F2, F3 as shown in FIG. 5b. In operation as multiplexer, the second device 200 enables multiplexing of the four input beams F0, F1, F2, F3 (supplied to the ports distinguished in FIG. 5b with the values representing the corresponding orbital angular momenta) into a single beam $F_{MD}$.

With reference to operation as demultiplexer, the second multiplexer/demultiplexer device 200 shown in FIG. 5b comprises an input demultiplexer MUX/DEM, a first output demultiplexer MUX/DEM1 and a second output demultiplexer MUX/DEM2, each made in a way similar to the first multiplexer/demultiplexer device 100 shown in FIG. 1.

The input demultiplexer MUX/DEM, which is similar to the first multiplexer/demultiplexer device 100 of FIG. 1, has its own second prism PR2 rotated through an angle $\theta$ of $\pi/2$. The first output demultiplexer MUX/DEM1 has its own second prism PR2 rotated through an angle of $\pi/4$ and further comprises a delay lamina PS that is able to introduce a phase delay of $\pi/2$ in the corresponding arm of the interferometer. The delay lamina PS is set between the second prism PR2 and the second splitter BS2 and may be obtained by means of a purposely provided optical component having an appropriate thickness or else by means of a suitable regulation of the interferometer during assembly.

The second output demultiplexer MUX/DEM2 has its own second Porro prism PR2 rotated through an angle of $\pi/2$, in a way similar to the first multiplexer/demultiplexer device 100.

In operation, the input demultiplexer MUX/DEM separates the beams with even orbital angular momentum F0, F2 from those with odd orbital angular momentum F1, F3. The beams with even orbital angular momentum F0, F2 are conveyed towards the second demultiplexer MUX/DEM2, which separates on corresponding output ports the beam F0 with orbital angular momentum l=0 from the beam F2 with orbital angular momentum l=2.

The beams with odd orbital angular momentum are conveyed from the input demultiplexer MUX/DEM to the first output demultiplexer MUX/DEM1. The action of the second Porro prism PR2, rotated through an angle of $\pi/4$, and of the delay lamina PS, which introduces a phase delay of $\pi/2$, enables phase shifts of $\pi$ (or multiples of $\pi$) to be obtained such as to cause the desired destructive or constructive interferences. Consequently, the first output demultiplexer MUX/DEM1 separates on corresponding ports the beam F1 with orbital angular momentum l=1 from the beam F3 with orbital angular momentum l=3.

Operation of the second multiplexer/demultiplexer device 200 as multiplexer may be easily derived from the foregoing description and from FIG. 5b.

In addition, it should be noted that, as emerges clearly from the description of FIG. 5, using a plurality of multiplexer/demultiplexer devices similar to those described for the second multiplexer/demultiplexer device 200 it is possible to multiplex/demultiplex any number of optical beams.

Figure 6:
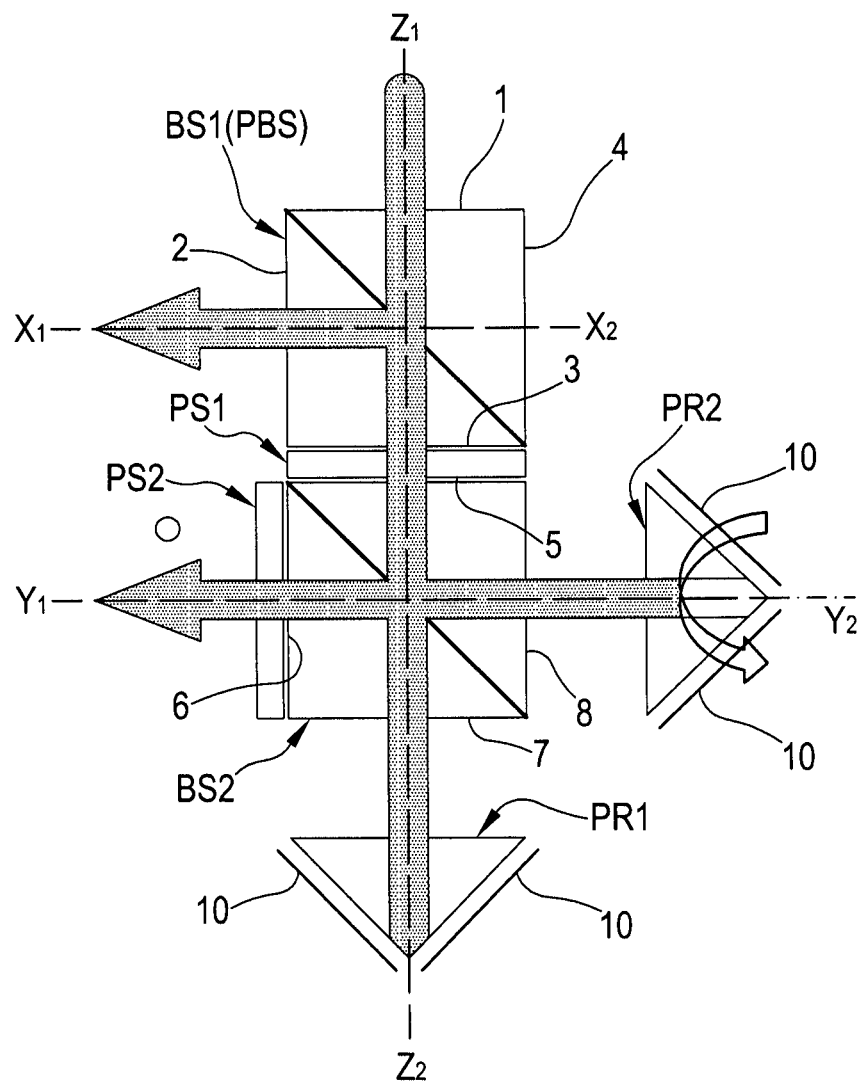
FIG. 6 is a schematic illustration of an example of a third multiplexer/demultiplexer device depending upon polarization.

FIG. 6 regards a third multiplexer/demultiplexer device 300 which has a Michelson-interferometer architecture similar to that of the first multiplexer/demultiplexer device 100, but comprises some optical components that depend upon polarization. In greater detail, the first beam splitter BS1 is provided by means of a cubic beam splitter of the type sensitive to polarization (also known as "polarization beam splitter"), designated in FIG. 6 also by the symbol PBS. The second beam splitter BS2 is, also in this case, of the type insensitive to polarization.

Moreover, the third multiplexer/demultiplexer device 300 comprises a first delay lamina of the half-wave type PS1, which is oriented at an angle of 22.5° with respect to a pre-set polarization of the radiation at its own input and is set between the third input/output port 3 of the first beam splitter sensitive to polarization BS1 and the fifth input/output port 5 of the second beam splitter BS2.

Preferably, a second delay lamina PS2 of the half-wave type, oriented with an angle of 22.5° with respect to a pre-set polarization of the radiation at its own input, is optically coupled to the sixth input/output port 6 of the second splitter BS2.

For operation, the third multiplexer/demultiplexer device 300 envisages that the optical beams at input, such as for example, those of the composite input beam Fi of FIG. 2, will present a pre-set polarization, for example, horizontal.

Reference is made to operation as demultiplexer. The incoming beam of optical radiation Fi with horizontal polarization traverses, without any attenuation, the first splitter BS1 sensitive to polarization and provided for reflecting just the vertical polarization and for transmitting the horizontal polarization.

Before reaching the second simple splitter BS2, the composite beam Fi will traverse the first delay lamina PS1. In this way, the radiation that enters the second splitter BS2 (which does not depend upon polarization) and impinges on the first prism PR1 and on the second prism PR2 will have a state of linear polarization oriented at 45°.

The radiation back-reflected by the first prism PR1 and by the second prism PR2 maintains this state of polarization (in fact the incident beam undergoes in the Porro prisms a double reflection, and this guarantees maintenance of the same state of polarization). When this radiation traverses again the first delay lamina PS1, its polarization is rotated into the vertical state. It is then reflected by the first splitter BS1 and, without losses, is sent to the second output port 2.

The portion of radiation back-reflected by the first prism PR1 and by the second prism PR2 that reaches the sixth output port 6 of the second splitter BS2 also undergoes a rotation of its own polarization, which thus becomes vertical again. The modality with which the constructive and destructive interference occurs on the basis of the value of the orbital angular momentum for the third multiplexer/demultiplexer device 300 is identical to the one already described for the first multiplexer/demultiplexer device 100.

The third multiplexer/demultiplexer device 300 affords the advantage of not presenting losses. In fact, all the power associated to the composite optical input beam Fi is then sent back on the second output port 2 and on the sixth output port 6, without losses, unlike what occurs in the first multiplexer/demultiplexer device 100.

In operation as multiplexer, the second port 2 and the sixth port 6 have the role of input ports for the beams with different orbital angular momentum to be multiplexed, whereas the first port 1 has the role of output port for the multiplexed beam Fi.

The beams at input to the second output port 2 and to the sixth output port 6 are supplied by the second source S2 and the third source S3, respectively, in such a way that they will present, for example, a vertical polarization. The multiplexed output beam Fi has, instead, a polarization orthogonal to that of the input beams and hence, in the example, a horizontal polarization.

Figure 7:
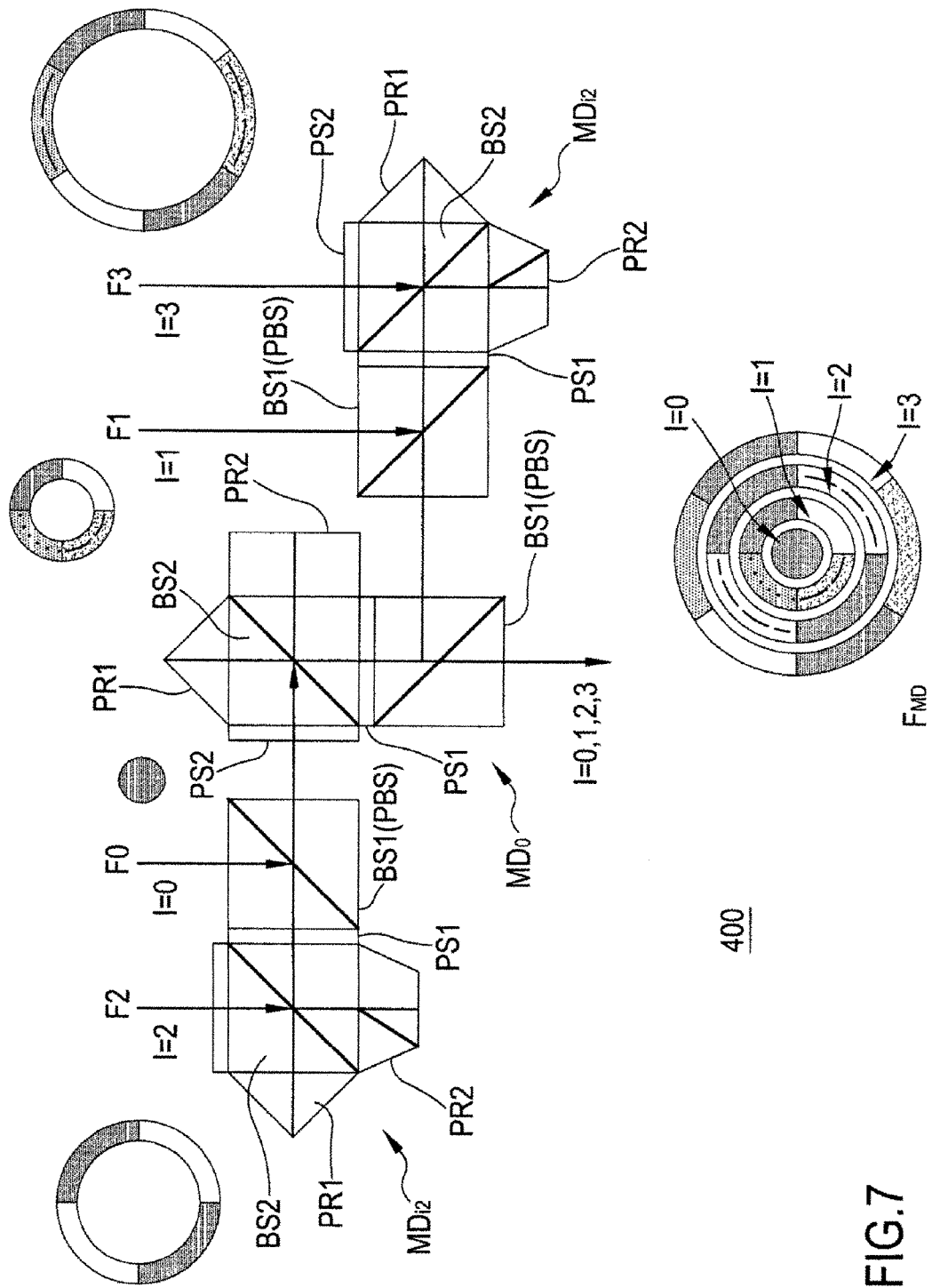
FIG. 7 is a schematic illustration of an example of a fourth multiplexer/demultiplexer device depending upon polarization suitable for 4:1 multiplexing.

FIG. 7 shows a fourth multiplexer/demultiplexer device 400 comprising an output multiplexer device MDo, a first input multiplexer device MDi1 and a second input multiplexer device MDi2, each obtained in a way similar to the third multiplexer/demultiplexer device 300.

FIG. 7 regards operation of the fourth multiplexer/demultiplexer device 400 as multiplexer, but it can operate also as demultiplexer in so far as the output multiplexer device MDo, the first input multiplexer device MDi1, and the second input multiplexer device MDi2 can operate also as demultiplexers.

For example, the fourth multiplexer/demultiplexer device 400 can multiplex/demultiplex four beams F0, F1, F2, F3 in/from a composite beam $F_{MD}$, starting from sources of optical radiation with pre-set polarization.

The output multiplexer device MDo is provided with a respective second Porro prism PR2 rotated through an angle θ of π/2. The first input multiplexer device MDi1 and the second input multiplexer device MDi2 have the respective second Porro prisms PR2 rotated through an angle θ of π/4.

Figure 8:
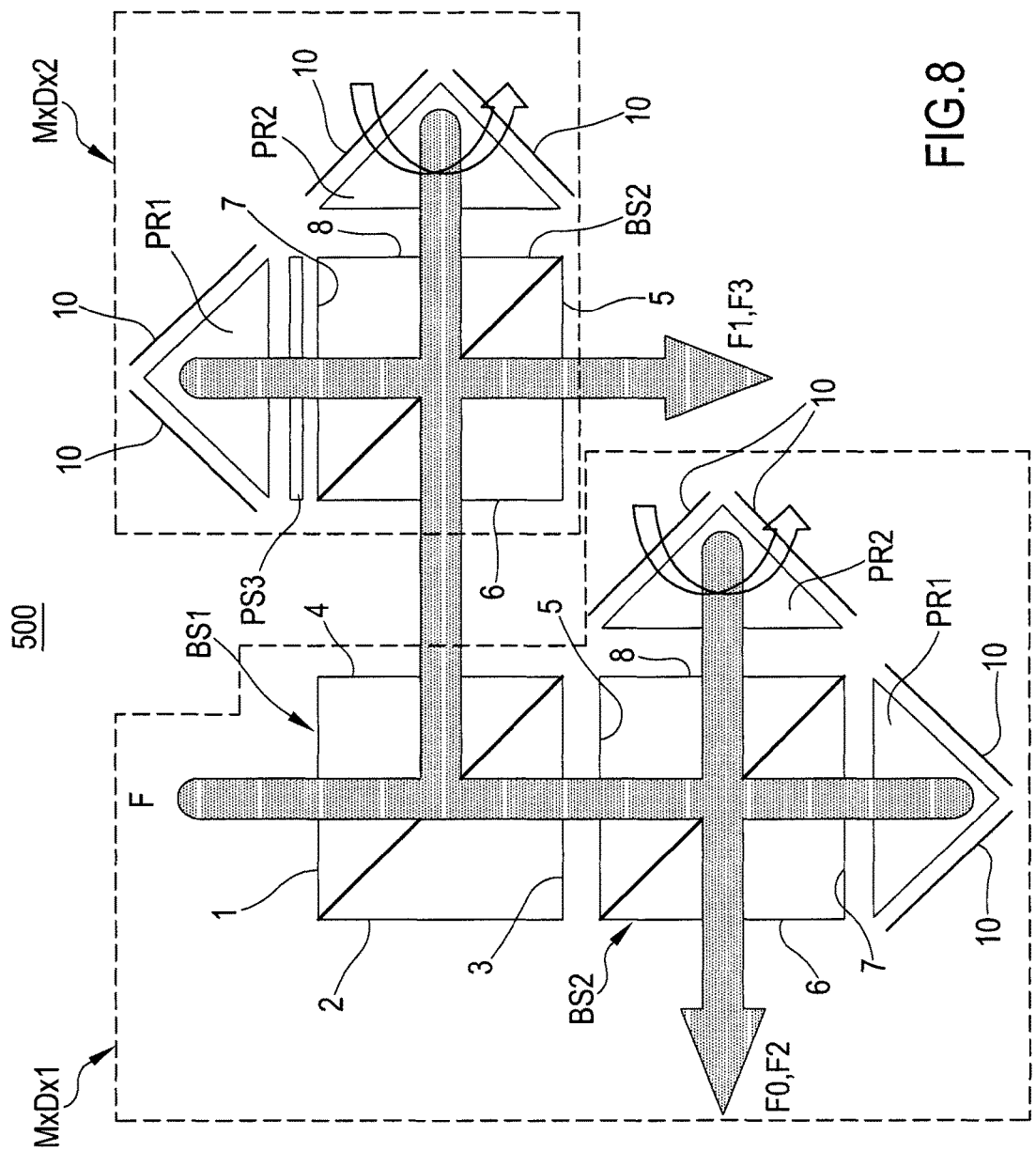
FIG. 8 is a schematic illustration of an example of a fifth multiplexer/demultiplexer device independent of polarization, which uses an additional interferometer.

FIG. 8 regards a fifth multiplexer/demultiplexer device 500 that is of a type insensitive to the state of polarization and presents reduced losses as compared to the first multiplexer/demultiplexer device 100 of FIG. 1.

The fifth multiplexer/demultiplexer device 500 is particularly suited for operating as demultiplexer in so far as the optical beams having an orbital angular momentum resulting from propagation, in the optical fibre or in free space, frequently present a random state of polarization.

The fifth multiplexer/demultiplexer device 500 presents the structure of a double Michelson interferometer and comprises a first interferometric device MXDX1 optically coupled to a second interferometric device MXDX2. The first interferometric device MXDX1 may be structurally identical to the first multiplexer/demultiplexer device 100 described with reference to FIG. 1.

The second interferometric device MXDX2 is similar to the first multiplexer/demultiplexer device 100 but, unlike this, does not comprise the first splitter BS1 and is hence provided with the respective second beam splitter BS2, the respective first Porro prism PR1, and the respective second Porro prism PR2. Moreover, the second interferometric device MXDX2 may comprise a third delay lamina PS3 such as to introduce in the radiation that traverses it a phase delay of π/2. Alternatively, instead of using a delay lamina, the arm of the second interferometric device MXDX2 that includes the first Porro prism PR1 may be structured in such a way as to introduce in the radiation that traverses it a phase delay of π/2.

For example, the composite input beam $F_{MD}$ (FIG. 5a) is supplied to the first input port 1 of the first interferometric device MXDX1 and a portion thereof is transmitted to the second splitter BS2 of the first interferometric device MXDX1 and another portion (50%) is reflected towards the second splitter BS2 of the second interferometric device MXDX2.

According to the example, within the first interferometric device MXDX1 there takes place constructive interference for the beams that have even orbital angular momentum, which will hence be sent back onto the sixth output port 6 of the first interferometric device MXDX1 itself.

Within the second interferometric device MXDX2 a constructive interference complementary to the previous one is obtained; namely, according to the example, the optical beams provided with odd orbital angular momentum will interfere constructively and are made available on the fifth output port 5 of the second interferometric device MXDX2.

The fifth multiplexer/demultiplexer device 500 only presents a loss of a factor 2 (or 3 dB) for the output beams (on the second port 2) but this power loss is the same for both the beams that have even orbital angular momentum and the beams that have odd orbital angular momentum, unlike what occurs for the first multiplexer/demultiplexer device 100 of FIG. 1.

Figure 9:
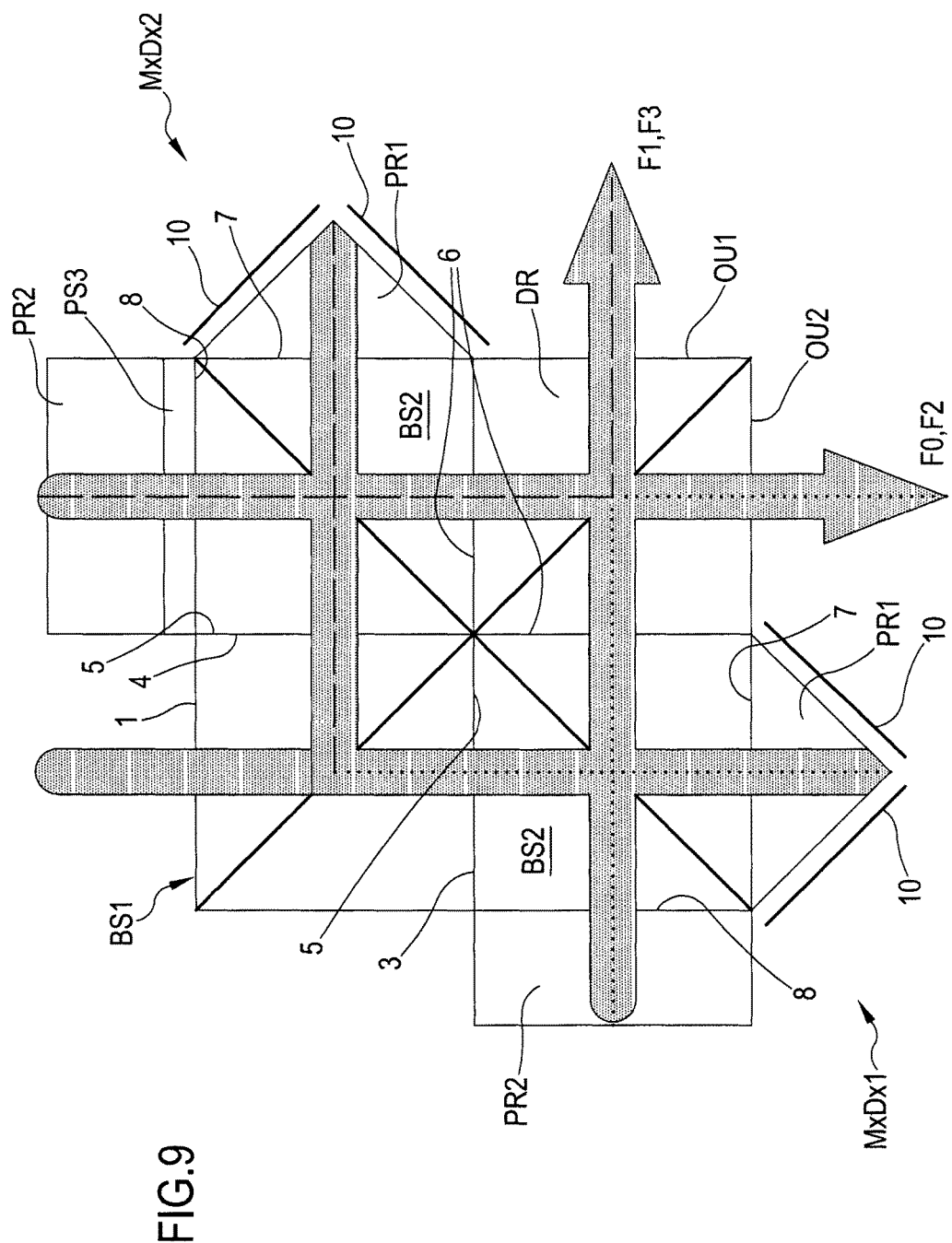
FIG. 9 is a schematic illustration of an example of a sixth multiplexer/demultiplexer device independent of polarization, similar to the fifth multiplexer/demultiplexer device.

FIG. 9 shows a sixth multiplexer/demultiplexer device 600 similar to the fifth multiplexer/demultiplexer device 500 of FIG. 8. In FIG. 9, the second prism PR2 of the first interferometric device MXDX1 is rotated through an angle θ=π/2, and also the second prism PR2 of the second interferometric device MXDX2 is rotated through an angle θ=π/2. The third delay lamina PS3 is set between the second splitter BS2 of the second interferometric device MXDX2 and the respective second prism PR2.

In the sixth multiplexer/demultiplexer device 600 of FIG. 9 the first interferometric device MXDX1 has its own sixth output port 6 (for the beams with even orbital angular momentum) coupled to a first input of a double-mirror device DR, such as an optical cube with reflection on two sides.

The second interferometric device MXDX2 has its own sixth port 6 optically coupled to a second input of the double-mirror device DR. In FIG. 9, the constructive-interference path followed by the beams with odd angular momentum is represented with a dotted line, whereas the constructive-interference path followed by the beams with odd angular momentum is represented with a dashed line. The double-mirror device DR is configured for supplying on a first reflection port OU1 the beams F1 and F3 with odd orbital angular momentum and on a second reflection port OU2 the beams F0 and F2 with even orbital angular momentum.

The sixth multiplexer/demultiplexer device 600 of FIG. 9 is particularly compact and easy to produce.

Figure 10:
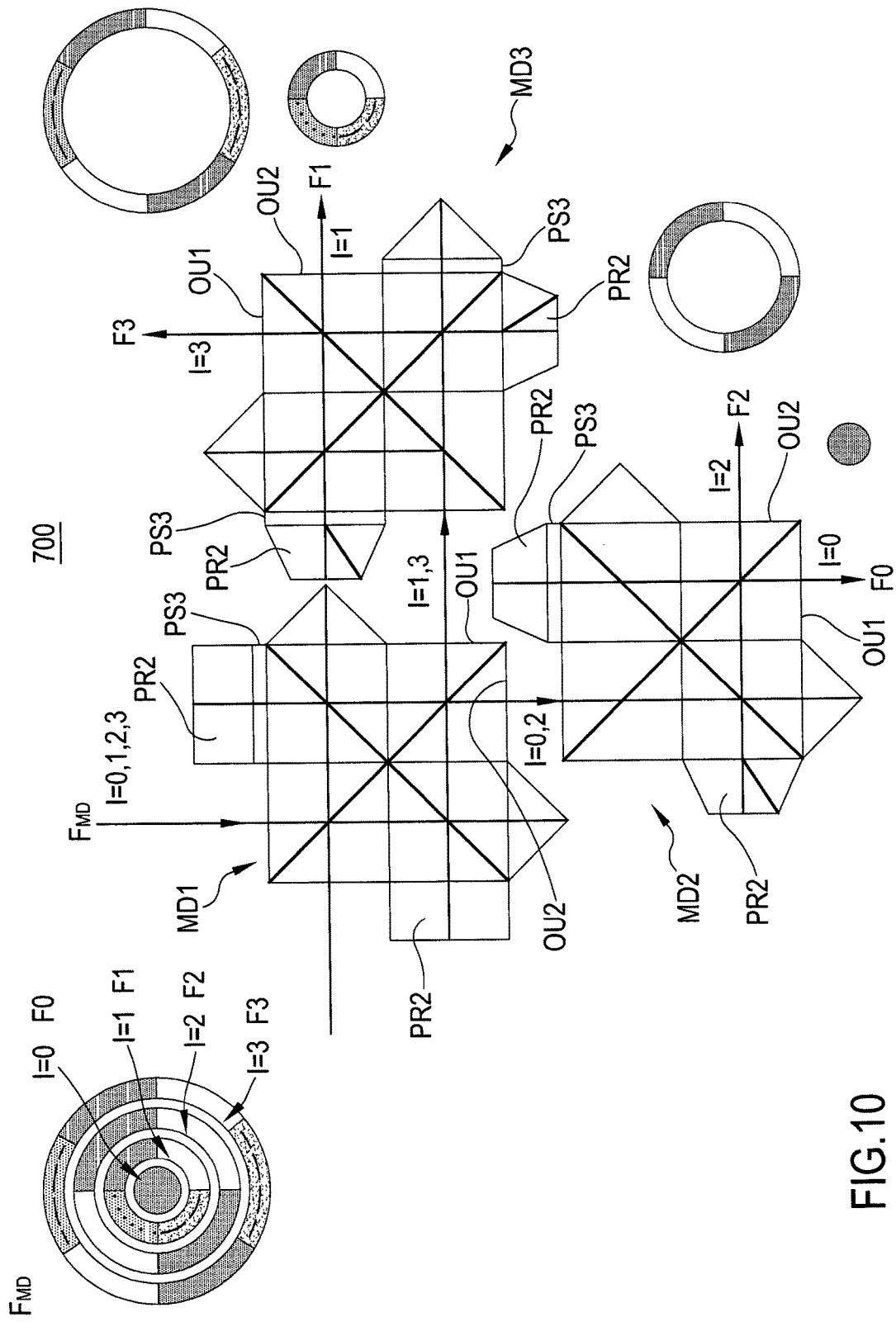
FIG. 10 is a schematic illustration of an example of a seventh multiplexer/demultiplexer device independent of polarization, comprising devices similar to the sixth multiplexer/demultiplexer device.

FIG. 10 regards a seventh multiplexer/demultiplexer device 700 structured for multiplexing/demultiplexing a beam $F_{MD}$ containing four beams F0, F1, F2, F3 that have different orbital angular momenta l=0, 1, 2, 3.

The seventh multiplexer/demultiplexer device 700 comprises a first multiplexer/demultiplexer module MD1, a second multiplexer/demultiplexer module MD2, and a third multiplexer/demultiplexer module MD3.

According to the example, the first multiplexer/demultiplexer module MD1 is identical to the sixth multiplexer/demultiplexer device 600 of FIG. 9 and is such as to receive (in its use as demultiplexer) on the first input port 1 the composite beam $F_{MD}$ and separate on the first reflection port OU1 the beams F1 and F3 with odd orbital angular momentum and on the second reflection port OU2 the beams F0 and F2 with even orbital angular momentum.

The second multiplexer/demultiplexer module MD2 is similar to the sixth multiplexer/demultiplexer device 600 but unlike this has the corresponding second Porro prisms rotated through an angle of $\theta=\pi/4$. The second multiplexer/demultiplexer module MD2 separates the two beams with even orbital angular momentum from one another, i.e., the beam F0 from the beam F2.

The third multiplexer/demultiplexer module MD3 is similar to the second multiplexer/demultiplexer module MD2, but unlike this has a fourth delay lamina PS4 (similar to the third delay lamina PS3) facing the first Porro prism PR1 corresponding to its own first interferometric device. The third multiplexer/demultiplexer module MD3 separates the beams with odd orbital angular momentum from one another, i.e., the beam F1 from the beam F3.

Figure 11:
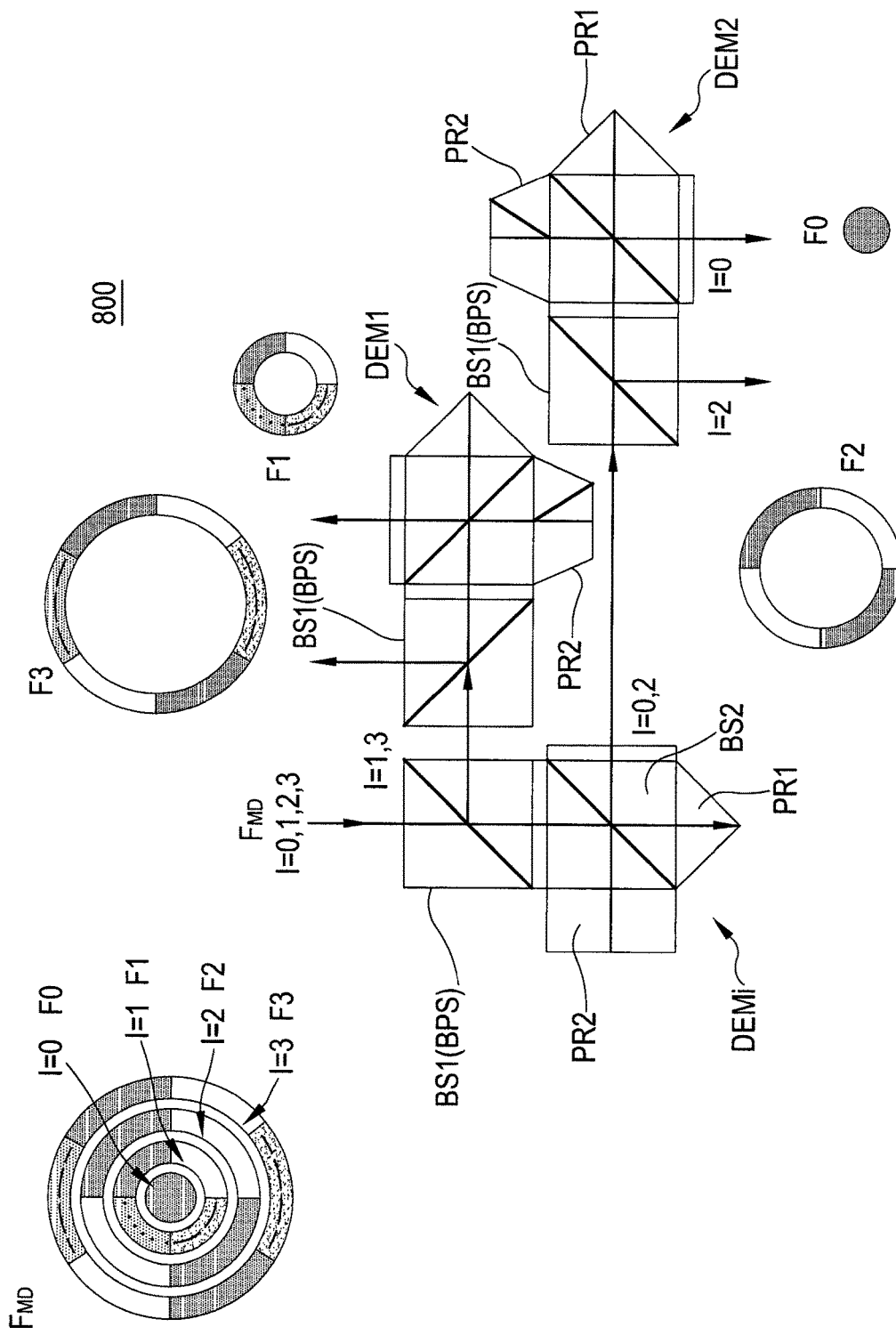
FIG. 11 shows an example of an eighth multiplexer/demultiplexer device depending upon polarization, comprising devices similar to the third multiplexer/demultiplexer device.

FIG. 11 shows an eighth multiplexer/demultiplexer device 800 represented, by way of example, with reference to operation as demultiplexer of the polarized composite beam $F_{MD}$. The eighth multiplexer/demultiplexer device 800 is of a type sensitive to polarization and comprises: an input demultiplexer module DEMi, a first output demultiplexer module DEM1, and a second output demultiplexer module DEM2. The first output demultiplexer module DEM1 and the second output demultiplexer module DEM2 are coupled to distinct output ports of the input demultiplexer module DEMi.

The input demultiplexer module DEMi may be identical to the third multiplexer/demultiplexer device 300 of FIG. 6 and is provided with a respective second Porro prism PR2 rotated through an angle $\theta$ of $\pi/2$. The input demultiplexer module DEMi separates the beams with even orbital angular momentum from the beams with odd orbital angular momentum.

The first output demultiplexer module DEM1 and the second output demultiplexer module DEM2 are similar to the third multiplexer/demultiplexer device 300 of FIG. 6 but have the respective second Porro prisms PR2 rotated through an angle $\theta$ of $\pi/4$.

The first output demultiplexer module DEM1 is configured so as to separate the two beams with odd orbital angular momentum (F1 and F3) from one another. The second output demultiplexer module DEM2 is configured so as to separate the two beams with even orbital angular momentum (F0 and F2) from one another. The eighth multiplexer/demultiplexer device 800 has an architecture similar to that of the seventh multiplexer/demultiplexer device 700 of FIG. 1 but does not present losses on the outputs of the beam splitters used.

Figure 12:
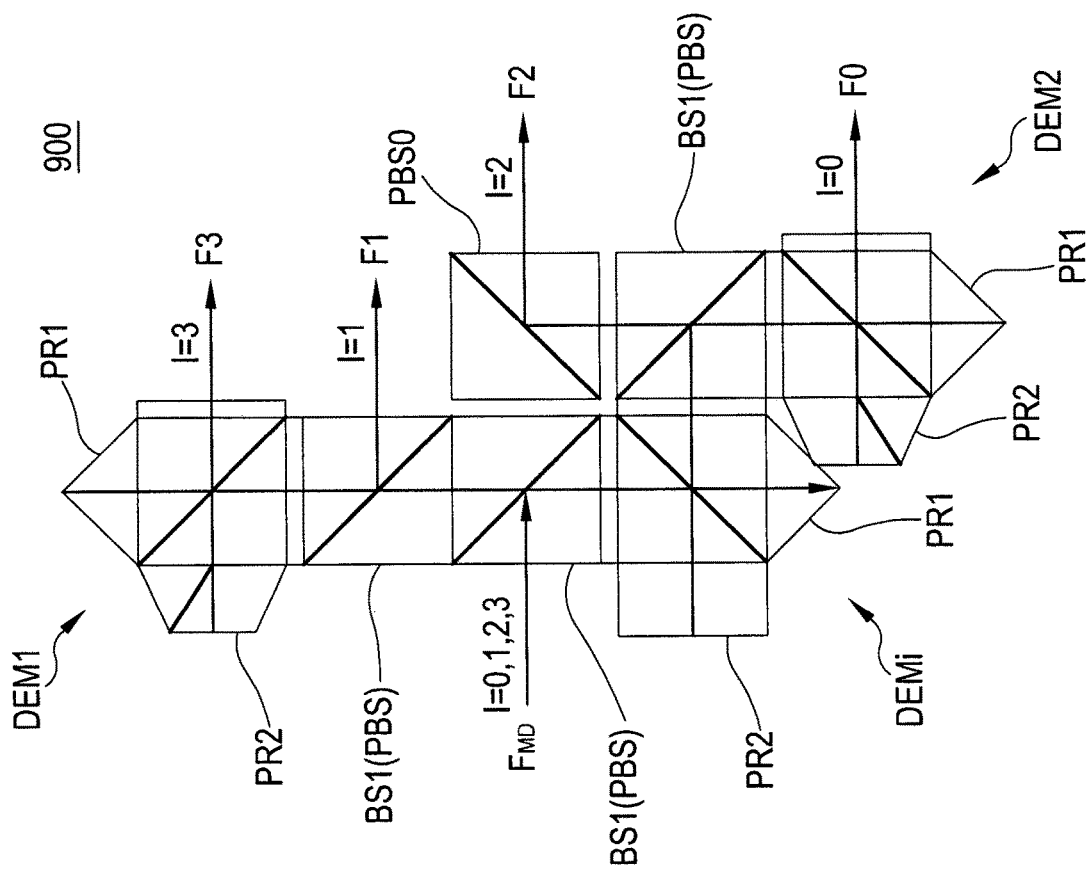
FIG. 12 shows an example of a ninth multiplexer/demultiplexer device dependent upon polarization, comprising devices similar to the third multiplexer/demultiplexer device.

FIG. 12 shows a ninth multiplexer/demultiplexer device 900 sensitive to polarization, represented, by way of example, with reference to operation as demultiplexer of the composite polarized beam $F_{MD}$. The ninth multiplexer/demultiplexer device 900 is similar to the eighth multiplexer/demultiplexer device 800 of FIG. 11 and represents a more compact version thereof.

In FIG. 12, an output port of the first splitter BS1 of the second output demultiplexer module DEM2 is coupled to an output polarization beam splitter PBS0 that acts on the beam F2 with orbital angular momentum l=2 rendering it parallel to the other beams resulting from demultiplexing.

Figure 13:
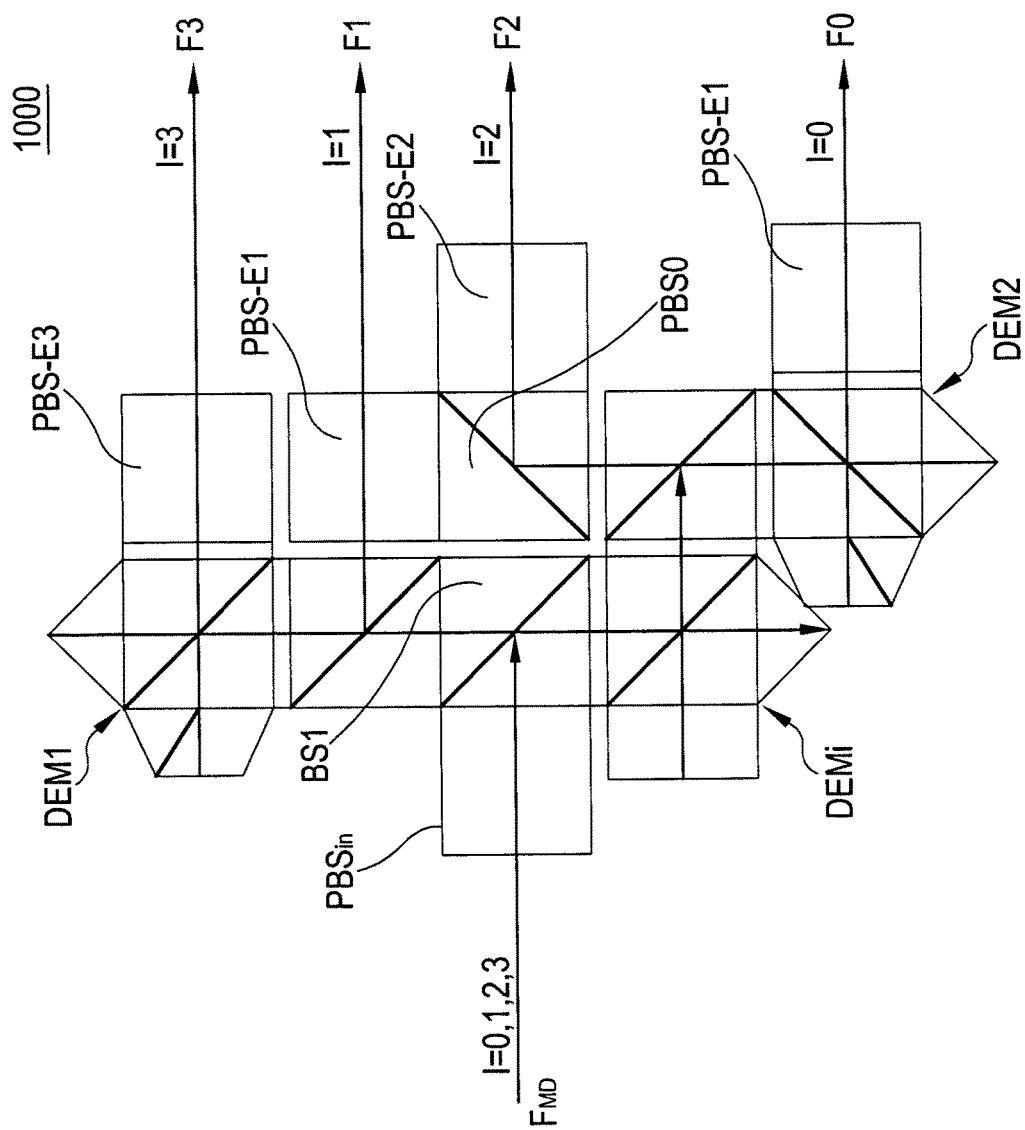
FIG. 13 shows an example of a tenth multiplexer/demultiplexer device independent of polarization, comprising devices similar to the third multiplexer/demultiplexer device.

FIG. 13 shows a tenth multiplexer/demultiplexer device 1000 obtained using the input demultiplexer module DEMi, the first output demultiplexer module DEM1, and the second output demultiplexer module DEM2, which are obtained and arranged as described for the ninth multiplexer/demultiplexer device 900. Unlike the ninth multiplexer/demultiplexer device 900, the tenth multiplexer/demultiplexer device 1000 is suited to multiplexing/demultiplexing also optical beams that have a non-preset polarization thanks to the use of polarization beam splitters.

In greater detail, the tenth multiplexer/demultiplexer device 1000 further comprises an input polarization beam splitter PBSin set at the input of the first splitter BS1 of the input demultiplexer module DEMi, an output polarization beam splitter PBS-E0, a first output polarization beam splitter PBS-E1, a second output polarization beam splitter PBS-E2, a third output polarization beam splitter PBS-E3, and a fourth output polarization beam splitter PBS-E4.

The input polarization beam splitter PBSin separates the input beam $F_{MD}$ into the two main polarizations, which are then made to interfere constructively or destructively by the input demultiplexer module DEMi, by the first output demultiplexer module DEM1, and by the second output demultiplexer module DEM2 as already described.

The output polarization beam splitter PBS-E0 recovers at output from the second output demultiplexer module DEM2 the beam F0 having orbital angular momentum l=0.

The first output polarization beam splitter PBS-E1 recovers at output from the first output demultiplexer module DEM1 the beam F1 having orbital angular momentum l=1.

The second output polarization beam splitter PBS-E2 recovers at output from the output polarization beam splitter PBS0 the beam F2 having orbital angular momentum l=2.

The third output polarization beam splitter PBS-E3 recovers at output from the first output demultiplexer module DEM1 the beam F3 having orbital angular momentum l=3.

It should be noted that the embodiments described enable a compact structure of the multiplexer/demultiplexer device to which they refer. For example, the various optical components used, of a bulk type, can be glued together (with possible insertion of delay laminas, when envisaged) and the Porro prisms can be machined so as to present dimensions that do not depart from the dimensions of the beam-splitter cubes even when they are rotated.

The multiplexer/demultiplexer devices 100-1000 described can be used for providing, in optical telecommunications systems, a further multiplexing layer, also referred to as "space-division multiplexing" (SDM) or "mode-division multiplexing (MDM)" that can be added to a wavelength-division-multiplexing (WDM) layer.

On both layers it will then be possible to develop the known techniques both of intensity modulation and of phase modulation to obtain extremely high-capacity optical connections both in free space and in optical fibre.

Moreover, it should be noted that the embodiments described above make it possible to provide also optical devices and subsystems that can be obtained using multiplexer and demultiplexer devices, such as for example, optical add-drop multiplexers (OADM), which enable both beam extraction and beam introduction.

The invention claimed is:

1. A multiplexer/demultiplexer optical device comprising:
a first beam-splitter, which is provided with first input/output ports for receiving/supplying composite optical beams;
a second beam-splitter, which is provided with second input/output ports and is optically coupled to the first splitter;
a first Porro-prism reflector, which is optically coupled to the second splitter;
a second Porro-prism reflector, which is optically coupled to the second splitter and is structured for introducing into optical beams that traverse it a phase delay depending upon an orbital angular momentum of the composite optical beams and upon an orientation of the second reflector;
wherein said device is a Michelson interferometer structured for obtaining constructive/destructive interferences to multiplex/demultiplex on/from corresponding input/output ports, on the basis of values of orbital angular momentum, a composite optical beam comprising a plurality of concentric optical beams with cylindrical symmetry that have different values of orbital angular momentum,
wherein the first splitter comprises:
a first input/output port for a composite optical beam to be demultiplexed and for the composite optical beam obtained from multiplexing;
an output port for a portion of the composite optical beam; and
a second input/output port for a first optical beam that forms part of the composite optical beam and has a first orbital angular momentum;
and wherein the second splitter comprises:
a third input/output port for a second optical beam that forms part of the composite optical beam and has a second orbital angular momentum;
and wherein the first splitter further comprises:
a first port for coupling to the second splitter;
and wherein the second splitter comprises:
a second port for coupling to the first port of the first splitter;
a second coupling port optically coupled to the first reflector;
and a third coupling port optically coupled to the second reflector.

2. The device according to claim 1, wherein: the first reflector and/or the second reflector comprise mirror-finished reflecting surfaces for rendering operation of the first and/or of the second reflector independent of polarization of the optical beams.

3. The device according to claim 1, wherein the second reflector is constructed and arranged to introduce a phase delay of a value belonging to the group π/2, π/4, π/8, for introducing, respectively, phase delays of π, π/2, and π/4.

4. The device according to claim 1, wherein said composite optical beam comprises at least two beams with even orbital angular momentum and at least two beams with odd orbital angular momentum and wherein the device further comprises:
a first multiplexer/demultiplexer device, which is optically coupled to the second input/output port and is structured as a Michelson interferometer for multiplexing/demultiplexing said at least two optical beams with odd orbital angular momentum on/from corresponding input/output ports; and
a second multiplexer/demultiplexer device, which is optically coupled to the first input/output port and is structured like a Michelson interferometer for multiplexing/demultiplexing said at least two optical beams with even orbital angular momentum on corresponding input/output ports.

5. The device according to claim 1, wherein said first splitter is of the type independent of polarization of an optical radiation that traverses it.

6. The device according to claim 1, wherein said first splitter is of the type depending upon polarization and is config-configured so as not to transmit on said output port radiation having a pre-set polarization, the device further comprising:
a first optical component, which is able to rotate the polarization and is set between the first splitter and the second splitter; and
a second optical component, which is able to rotate the polarization and faces the third input/output port.

7. The device according to claim 1, wherein the first splitter (BS1) is of the type independent of polarization, and the device further comprises:
an additional Michelson interferometer, which is optically coupled to the output port of the first splitter and comprises:
a third beam-splitter cube structured for transmitting/reflecting respective portions of the optical beam on a first reflection port, a second reflection port, and a further input/output port for at least one respective optical beam that is demultiplexed or is to be multiplexed;
a third Porro-prism reflector, which is optically coupled to the first reflection port; and
a fourth Porro-prism reflector, which is optically coupled to the second reflection port and is structured for introducing in respective optical beams that traverse it a phase delay depending upon an orbital angular momentum of the respective optical beams and upon an orientation of the fourth reflector.

8. The device according to claim 7, further comprising a double-mirror optical component coupled to the third input/output port of the second splitter and to the further input/output port of the third splitter of the additional Michelson interferometer.

* * * * *